Jan. 3, 1928.

P. VAN B. VAN VLOTEN ET AL 1,654,621

FLYING MACHINE LANDING LIGHT

Filed Sept. 28, 1923   3 Sheets-Sheet 1

Inventors
Pieter van Braam van Vloten
and Ernst Klebert
by B. Singer atty

Jan. 3, 1928.  1,654,621

P. VAN B. VAN VLOTEN ET AL

FLYING MACHINE LANDING LIGHT

Filed Sept. 28, 1923    3 Sheets-Sheet 2

Jan. 3, 1928. 1,654,621
P. VAN B. VAN VLOTEN ET AL
FLYING MACHINE LANDING LIGHT
Filed Sept. 28, 1923 3 Sheets-Sheet 3

Patented Jan. 3, 1928.

1,654,621

UNITED STATES PATENT OFFICE.

PIETER VAN BRAAM VAN VLOTEN, OF THE HAGUE, NETHERLANDS, AND EMIL KLEBERT, OF BERLIN-KARLSHORST, GERMANY, ASSIGNORS TO NAAMLOOZE VENNOOTSCHAP MACHINERIEEN EN APPARATEN FABRIEKEN, OF UTRECHT, NETHERLANDS.

FLYING-MACHINE LANDING LIGHT.

Application filed September 28, 1923, Serial No. 665,436, and in Germany January 23, 1923.

The invention relates to installations for illuminating and indicating the landing places in aerodromes, wherein one or more stationary lamps are used.

The object of the invention is to provide illumination for such landing-places which will not trouble the pilots of aeroplanes with shadows or dazzling effects when descending and landing, and to fulfill other practical requirements.

Hitherto the illumination and indication of the proper landing-places in aerodromes has been carried out by means of special lamps or by searchlights which in the form now in use have not proved effective owing either to shadows or to upwardly directed rays of light which blind the pilot during the descent, and make it difficult for him properly to judge his landing.

The invention aims at avoiding these disadvantages and obtaining such a distribution of light, that the landing-place is clearly illuminated and indicated without causing the shadows or blinding rays so troublesome to the pilot in descent.

A construction according to the invention is hereinafter described with reference to the accompanying drawings in which Figure 1 is a vertical section of a lamp according to the invention.

Figure 1:
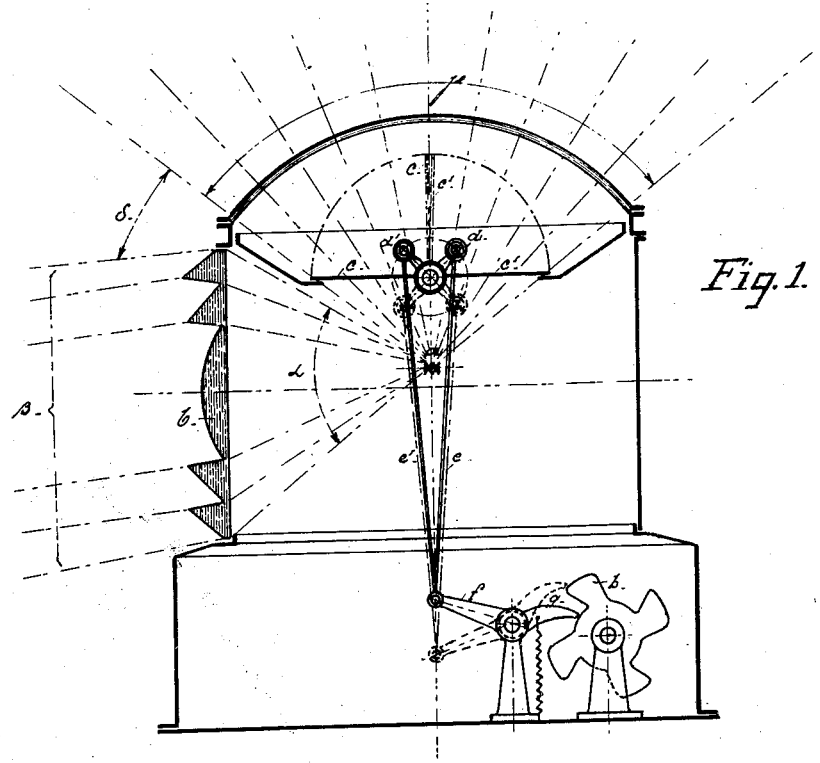

In Figure 1 the stationary source of light $a$ is arranged somewhat above the focal axis of the lens $b$.

The light projected on to the lens in the angle $\alpha$ is focused into a slightly dispersing cone of rays $\beta$ and by reason of the position of the light above the focal axis of the lens, the cone of rays is projected in a downward direction for illuminating the landing-place.

The cone of rays $\gamma$ projected upwardly above the angle $\alpha$ serves to indicate to the pilot the situation of the aerodrome. This cone of rays is projected as a flash light either white or coloured to distinguish it from other lights.

Further, between the two cones $\beta$ and $\gamma$ a dark region $\delta$ is left wherein the pilot may accustom himself to the illumination of the landing-place.

The upwardly projected cone of rays may also be reduced by the aid of optical means such as lenses, or reflectors, whereby the dark region becomes greater, and the intensity of the light of the cone increases.

Figure 2:
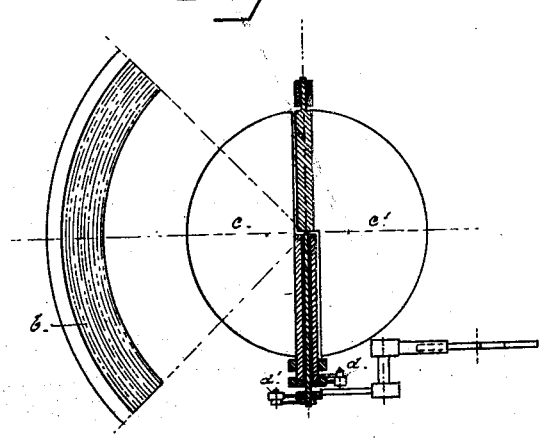
Figure 2 is a horizontal section corresponding to Figure 1.

For projecting the upwardly directed cone of rays as a flash light, a special shutter device is provided an example of which is shown in Figures 1 and 2.

This device consists of two movable curvilinear shutters $c$ and $c_1$ which in a manner similar to the wings of a butterfly when at rest can close together to an upper position in which the light may be projected through the openings thus formed, whereas when the shutters are returned, the upward projection of light is totally shut off. The movement of these shutters may for example be performed by a lever system $d\ d_1$ and rods $e\ e_1$. This lever system is reciprocated by a double armed lever $f$, $g$, the arm $g$ being actuated by a cam wheel $b$ having cams $h$. This wheel may be driven by any suitable means for example by clockwork.

In using a number of lamps in positions around the landing-place, it is advantageous to have all the lamps flashing upwardly in unison. An electro-magnetic mechanism may be adapted for this purpose whereby it is possible automatically to break and close the electric circuit of all the lamps from a central position.

Figure 5:
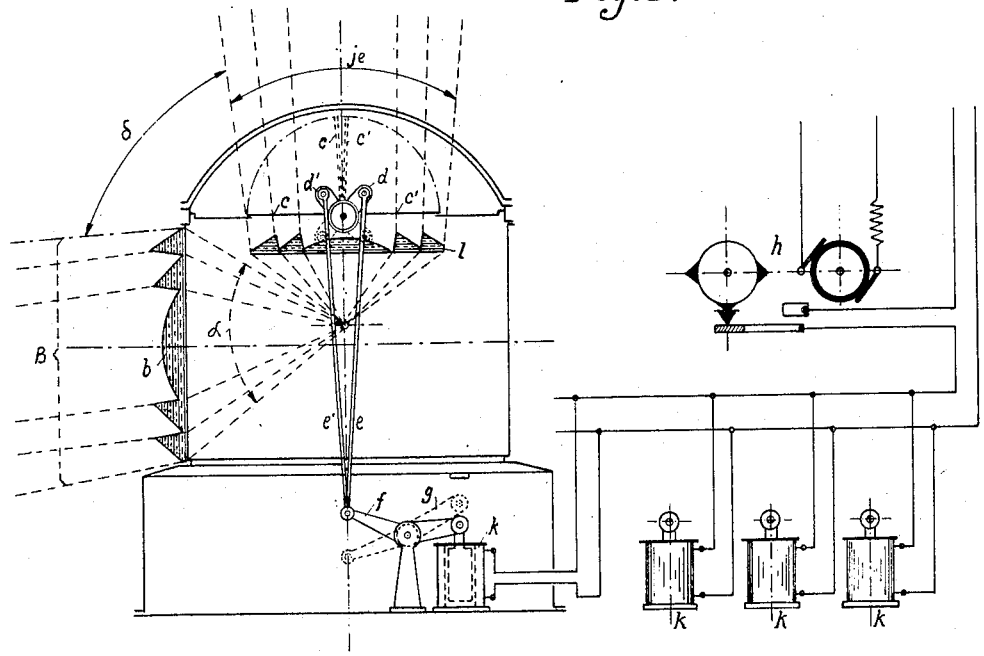
Figure 5 is a diagram partly in section of a form of the apparatus provided with electromagnetic operating mechanism.
Figure 6:
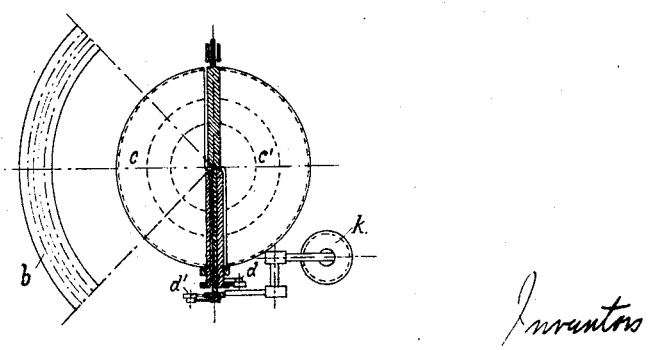
Figure 6 is a detail horizontal sectional view of the same.

In the diagrams, Figures 5 and 6, the lever $f$ is shown as provided with a solenoid $k$ for operating the same, the solenoids of the plurality of the landing lights being included in an electric circuit which is provided with an interrupter $h$.

The lights and the means associated therewith are arranged to cause upwardly directed rays to be directed from a central point.

For this purpose there is provided, as shown in Fig. 5, a search light lens 1 consisting of dioptrical ring elements so disposed in the lamp that its focus lies in the strongest light zone of the source of light. The rays of the source of light striking the reflector are collected and reflected in cone shaped form, with the apex-angle considerably amplified and directed vertically upward.

Instead of a lamp having as shown in the example a so-called belt- or girdle-lens, other types of light collecting elements may be used to obtain the cones of rays for the illumination of the landing place.

It is, however, essential in addition to the fixed bundle of rays which serves for illuminating the path, an intermittent or instantaneous flash illumination is produced which is directed upwardly, and it is essential that between these two bundles of rays there is presented a dark zone.

Figure 3:
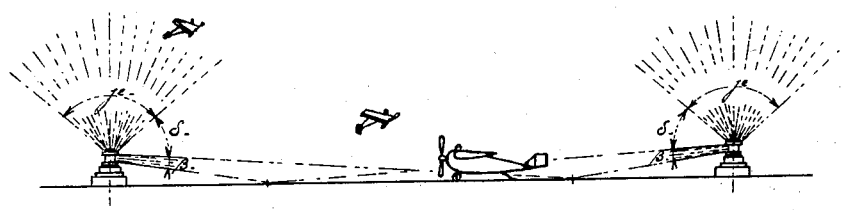
Figures 3 and 4 are views in elevation and plan respectively of an installation using four lamps.
Figure 4:
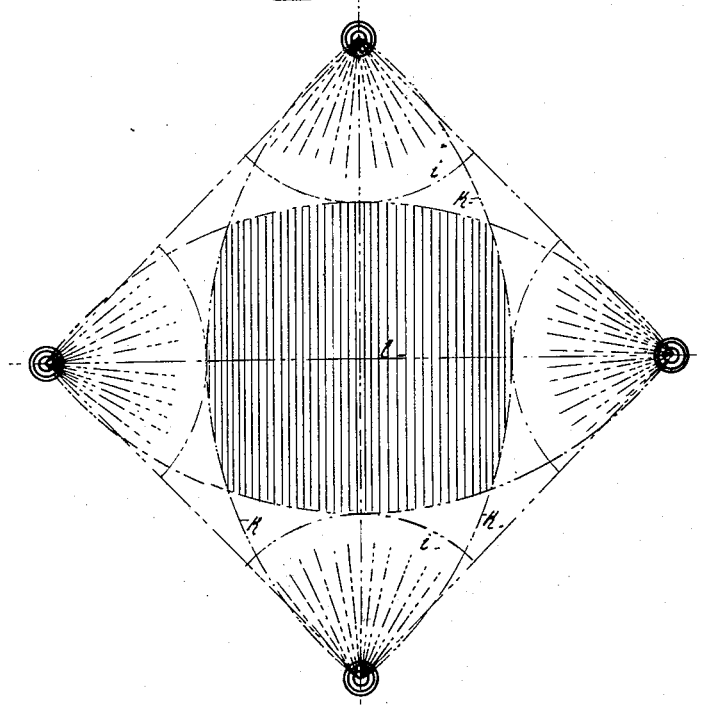

In Figs. 3 and 4 the effect of the described distribution of light is illustrated by reference to the use of a plurality of lanterns, namely four of them in elevation as well as plan view.

The outer rays corresponding to the cone $\beta$ strike the ground in arcs $i$ and $k$. In this manner an area is determined (shown in the drawing by hatching) which is illuminated and practically devoid of shadows. The pilot arriving at the aerodrome first passes into the cone of rays of the flash light and in further descent enters the dark region $\delta$ and finally lands his aeroplane on the landing-place without his eyes having been blinded by the light.

We claim:

Means for illuminating and indicating the landing path of flying fields, comprising a plurality of fixed lights, means to direct light rays upwardly, from the lights, means to direct downwardly inclined light rays on the landing path, and means to cut off light rays in the angles between said upwardly directed and said path directed rays to form zones of darkness between such upwardly directed and such path directed rays, said lights and said means associated therewith being arranged to cause their landing path illuminating rays to intercept one another and their upwardly directed rays to be directed from points around the circumference of the said field, said means for directing light rays upwardly being arranged to cut off such rays at will, and means to simultaneously operate the last-named means of the plurality of lights.

In testimony whereof, we have signed our names to this specification.

PIETER van BRAAM van VLOTEN.
EMIL KLEBERT.